(12) United States Patent
Stelson et al.

(10) Patent No.: US 6,726,413 B1
(45) Date of Patent: Apr. 27, 2004

(54) CONTOUR PLUNGE MILLING

(75) Inventors: Thomas Semon Stelson, Kirtland, OH (US); Stephen Curtis Jerrome, Grafton, OH (US); Robert Albin Meditz, Mentor, OH (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 10/319,984

(22) Filed: Dec. 16, 2002

(51) Int. Cl.[7] .................................................. B23C 1/00
(52) U.S. Cl. ........................ 409/132; 409/191; 409/199
(58) Field of Search ................................. 409/191, 199, 409/132, 185, 190, 201, 204, 211

(56) References Cited

U.S. PATENT DOCUMENTS

| | | | |
|---|---|---|---|
| 4,624,610 A | | 11/1986 | Phillips et al. |
| 5,090,851 A | * | 2/1992 | White .......................... 409/199 |
| 5,378,091 A | * | 1/1995 | Nakamura ................... 409/132 |
| 5,595,463 A | * | 1/1997 | Takegahara et al. ......... 409/132 |
| 5,779,406 A | * | 7/1998 | Astor .......................... 409/132 |
| 5,820,308 A | * | 10/1998 | Hoefler ......................... 407/40 |
| 5,919,012 A | * | 7/1999 | Nakagawa et al. .......... 409/132 |
| 5,938,381 A | * | 8/1999 | Diehl et al. .................. 409/132 |
| 6,056,485 A | * | 5/2000 | Magill et al. .................. 407/54 |
| 6,334,744 B1 | * | 1/2002 | Jasper et al. ................. 409/132 |
| 6,390,740 B1 | * | 5/2002 | Nesbitt et al. ............... 409/132 |
| 6,491,482 B1 | * | 12/2002 | Fenkl et al. ................. 408/132 |

* cited by examiner

Primary Examiner—Erica Cadugan
Assistant Examiner—Dana M Ross
(74) Attorney, Agent, or Firm—Renner, Otto, Boisselle & Sklar, LLP

(57) ABSTRACT

A plunge milling system (10) for effecting rapid removal of material from a workpiece blank during a rough and/or finishing cutting procedure. In this system, an axial cutting tool (12) is rotated about its axis and axially moved into engagement with the workpiece blank for cutting material from the workpiece. When the tool (12) is engaged with the workpiece, the tool is also moved transaxially and simultaneously with the axial movement whereby material is removed from the workpiece blank along a curved path.

19 Claims, 3 Drawing Sheets

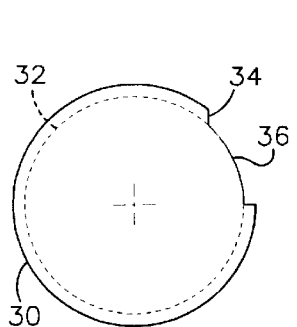
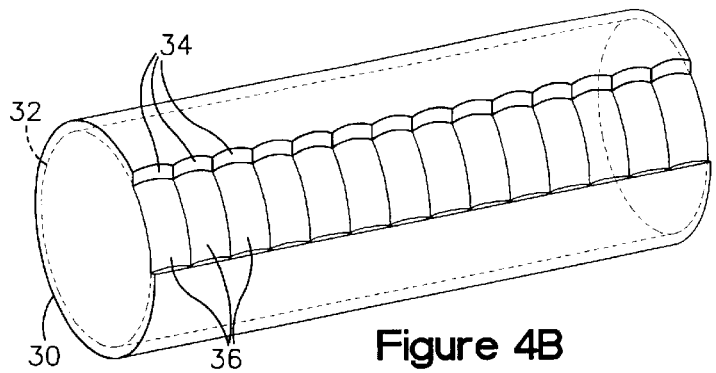
Figure 4A   Figure 4B
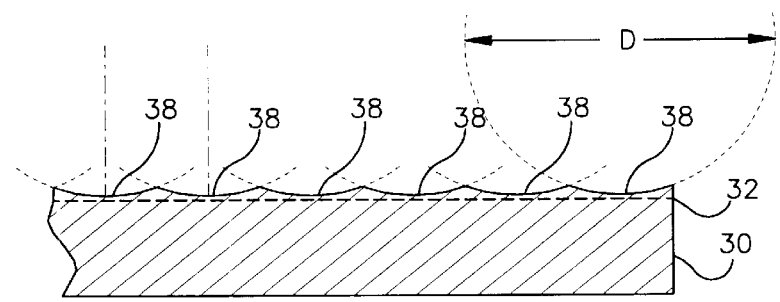
Figure 5
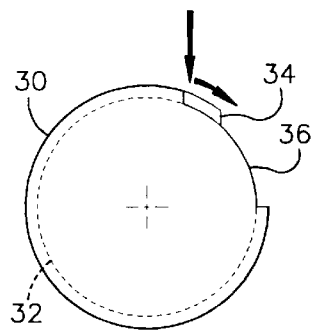
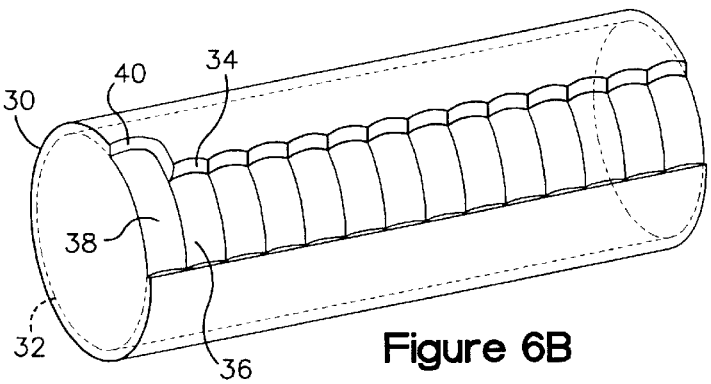
Figure 6A   Figure 6B
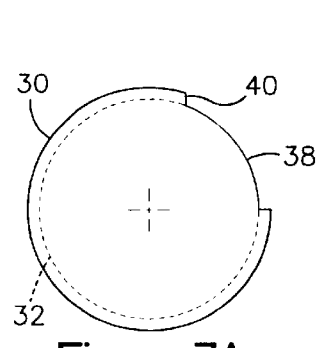
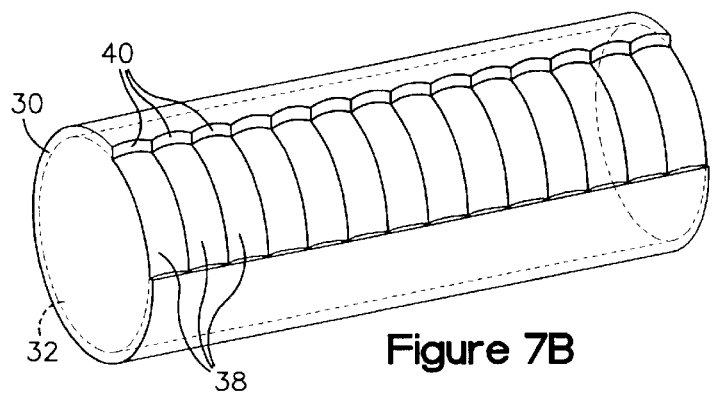
Figure 7A   Figure 7B

CONTOUR PLUNGE MILLING

FIELD OF THE INVENTION

This invention relates generally as indicated to a method of plunge milling for removing large amounts of material from a workpiece blank.

BACKGROUND OF THE INVENTION

Plunge milling is commonly viewed as an extremely efficient method for removing large amounts of material (e.g., 20% to 60% or more than traditional peripheral milling methods) from a workpiece blank. In such a milling process, a cutting tool is plunged axially and repeatedly into the workpiece blank in a series of overlapping passes to create an intermediate workpiece. The intermediate workpiece is then de-roughed and finished to create the final workpiece. Plunge milling is distinct from the more traditional peripheral milling methods where a cutting tool with one or more side cutting elements is moved transversely with respect to its rotational axis such that cutting occurs at the periphery of the rotating cutting tool rather than at the axial end of the cutting tool in the case of plunge milling.

An axial cutting tool typically comprises a spindle and a holder which carries cutting elements. The cutting elements are almost always replaceable inserts as they are the high-wear items in a plunge milling system. In any event, a plunge cutting tool can have as few as one cutting element, but usually has a plurality of cutting elements arranged around the circumference of the holder. The cutting elements are designed and arranged on the holder so that their axial edges form the cutting surfaces. Thus, for example, in a vertical plunge milling arrangement, the bottom edge of the cutting element defines its cutting surface.

The spindle of the axial cutting tool is attached to a feed mechanism for controlled rotational and axial movement of the axial cutting tool. During a plunge milling operation, a radially outer edge portion of the rotating axial cutting tool is aligned with a to-be-removed region of the workpiece blank and moved axially so that the cutting elements engage the material. The rotation of the cutting elements removes the material in crescent-shaped cuts and the axial movement continues until the tool reaches a predetermined stop-pass position. Accordingly, material is removed from the workpiece blank in a straight axial path.

Upon reaching the stop-pass position, the tool is axially retracted and then shifted laterally for alignment with an adjacent to-be-roughed (and usually overlapping) region of the workpiece blank for another pass of the cutting tool. These passes can be continued along the length of the workpiece. To prevent any interference between the cutting inserts and the workpiece blank during the retracting movement, the tool can be shifted laterally outward just prior to retraction.

A hallmark characteristic of plunge milling has conventionally been that the axial cutting tool moves only in the axial direction while in engagement with the material. This concentration on axial tool movement during cutting, and the avoidance of transaxial movement, has traditionally been viewed as important to increasing material removal rates and prolonging tool life.

SUMMARY OF THE INVENTION

The present invention provides a plunge milling method wherein an axial cutting tool is moved both axially and transaxially while in engagement with the workpiece material. Thus, this method of "contour" plunge milling completely contradicts the conventional straight plunge milling characteristic of limiting "cutting" tool movement to only the axial direction. When compared to traditional plunge milling techniques, the method of the present invention has demonstrated dramatically increased (e.g., 200%) material removal rates, a significant reduction in wear-and-tear on the milling system, and an intermediate product shape that is much closer in appearance to a desired final profile. In some applications, contour plunge milling also can be used for finishing operations.

More particularly, the present invention provides a method for effecting rapid removal of material from a workpiece blank during a rough cutting procedure. The method comprises the conventional plunge milling steps of rotating an axial cutting tool about an axis and moving the tool along said axis and into engagement with the workpiece blank for cutting material therefrom. The method further comprises the step of also moving the tool transaxially and simultaneously with the axial movement when the tool is engaged with the workpiece blank. In this manner, material is removed from the workpiece blank along a curved path.

The method of the present invention can be performed by a system comprising the axial cutting tool, a feed mechanism for the tool, and a controller which is programed to provide the axial and transaxial movement of the cutting tool. Significantly, the plunge milling method of the present invention may be performed with a conventional plunge milling system with the controller being re-programmed to accomplish the desired cutting paths. Accordingly, replacement of existing equipment (other than the controller's motion instructions) can be avoided thereby minimizing capital expenditures. Also, the same equipment can be used to perform both the method of the present invention and traditional plunge milling methods.

These and other features of the invention are fully described and particularly pointed out in the claims. The following description and annexed drawings set forth in detail a certain illustrative embodiment of the invention, this embodiment being indicative of but one of the various ways in which the principles of the invention may be employed.

DRAWINGS

FIGS. 4A and 4B are schematic side and perspective views, respectively, of the workpiece blank once the first sequence of passes has been completed.

FIG. 5 is a schematic close-up view of the scalloped surface formed by the first sequence of passes on the workpiece blank.

FIGS. 6A and 6B are schematic side and perspective views, respectively, of the workpiece blank illustrating a initial cutter pass of a second sequence of passes according to the present invention.

FIGS. 7A and 7B are schematic side and perspective views, respectively, of the workpiece blank once the first and second sequences of passes have been completed.

DETAILED DESCRIPTION

Figure 1:
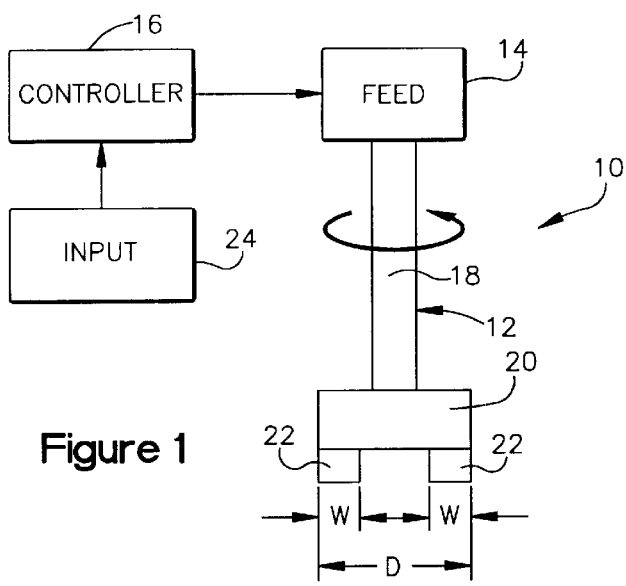
FIG. 1 is a schematic view of a plunge milling system for practicing the method of the present invention.
Figures 2A, 2B:
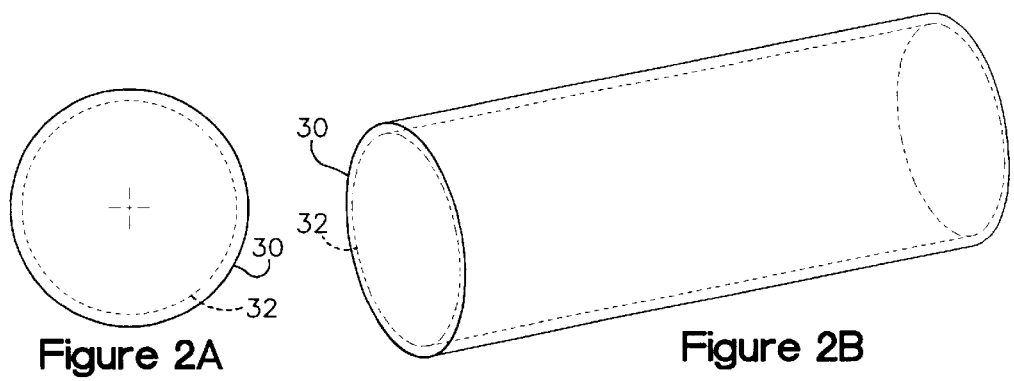
FIGS. 2A and 2B are schematic side and perspective views, respectively, of a workpiece blank with a desired profile being shown in phantom.

Referring now to the drawings in detail and initially to FIG. 1, a system 10 for practicing a plunge milling method according to the present invention is shown. Plunge milling is generally viewed as an extremely efficient method for removing large amounts of material (e.g., 20% to 60% or more) from a workpiece blank. The plunge milling method of the present invention is likewise extremely efficient and, moreover, has demonstrated dramatically increased (e.g., 500%) material removal rates when compared to conventional straight plunge milling methods.

The plunge milling system 10 comprises an axial cutting tool 12, a feed mechanism 14 for the tool 12, and a controller 16 which controls the feed mechanism 14. The plunge-cutting tool 12 comprises a spindle 18, a holder 20 attached to the spindle 18 for rotation therewith, and cutting elements 22 which are carried by the holder 20. The spindle 18 of the plunge-cutting tool 12 is attached to the feed mechanism 14 for controlled rotational, axial, and transaxial movement. The cutting elements 22 are preferably replaceable inserts and, in the illustrated embodiment, are arranged around the circumference of the holder 20. The path created by the outer radial edge of the cutting element(s) 22 during rotation defines the diameter D of the plunge-cutting tool 12. The radial span of the cutting element's cutting edge (the bottom edge in the illustrated orientation) defines the width W of each of the cutting elements 22.

According to the present invention, the controller 16 is programmed so that the axial cutting tool 12 is moved both axially and transaxially during cutting movements (i.e., when the cutting elements 22 are engaged in the material). To this end, motion instructions can be provided via an input 24 (e.g., disk drive, communication device such as a modem or network card, keyboard, touch screen, etc.). The controller 16 moves the cutting tool 12 in accordance with the motion instructions thereby to implement the method of the present invention.

Significantly, the plunge milling system 10 can be a conventional plunge milling system with the controller 16 being programmable to accomplish the desired cutting paths. Accordingly, replacement of existing equipment can often be avoided thereby minimizing capital expenditures. Also, the same system 10 can be used to perform both contoured plunge milling according to the present invention, traditional straight plunge milling methods, and peripheral milling methods.

Referring now to FIGS. 2–10, the method for effecting rapid removal of material from a workpiece blank 30 during a rough cutting procedure is schematically shown. In the illustrated embodiment, the workpiece blank 30 has a substantially cylindrical shape and the desired profile 32 (shown in dashed lines) is also a substantially cylindrical shape of a less diameter (FIGS. 2A and 2B). The material is removed from a first quadrant of the workpiece blank 30 (e.g., in the illustrated embodiment, the twelve-o-clock to three-o-clock area) by one or more sequences. Each sequence comprises at least one cutter pass and usually a series of parallel cutter passes of the axial cutting tool 12 along the length of the workpiece blank 30. The sequences can then be repeated on the other quadrants of the workpiece blank 30 to acquire the desired profile.

Figures 3A, 3B:
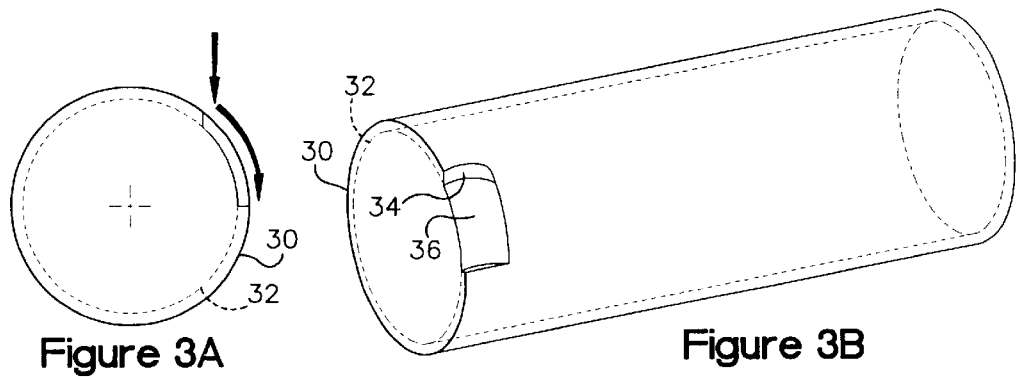
FIGS. 3A and 3B are schematic side and perspective views, respectively, of the workpiece blank illustrating an initial cutter pass of a first sequence of passes according to the present invention.

In the first sequence, material is removed from a first start-pass longitudinal line to a first stop-pass longitudinal line on the workpiece blank 30. To begin the first sequence, the rotating tool 12 is aligned with start-pass longitudinal line and with a start-sequence location on the workpiece blank. The rotating tool 12 is moved axially down into engagement with the material and then moved both axially and transaxially to follow the desired profile to the stop-pass position. (FIG. 3A.) Preferably, the start-sequence location corresponds to a portion of the workpiece blank 30 which allows the tool 12 to be shifted in one direction between inter-pass alignments. Also, preferably, the start-pass line, the pass depth, and the stop-pass line are chosen so that the same extent of the cutting elements engages the material throughout the transaxial movement. Another consideration for selecting the stop-pass line can be facilitation of retraction of the tool 12 at the end of the pass, such as where the workpiece's curvature changes in a retraction-advantageous manner.

In the illustrated embodiment, the start-sequence position is at one end of the workpiece blank 30, the start-pass line is at approximately the two-o-clock position, and the stop-pass line is at approximately the three-o-clock position. It may be noted that, in the illustrated workpiece blank 30, the pass depth results in material being removed to a depth just outside the desired profile of the workpiece blank 30. However, in certain applications, workpiece geometry and/or cutting element size may dictate a pass depth shy of the desired profile and the first sequence may have to be repeated (either immediately or after the subsequent sequences) to reach a depth just outside the desired profile.

After the first pass, the rotating tool 12 is retracted, shifted relative to the start-sequence location, and aligned with the start-pass line. During the second pass, the axial cutting tool 12 is again moved axially down into engagement with the workpiece material, and then moved both axially and transaxially to follow the desired profile to the stop-pass line. These passes are continued for the entire length of the workpiece blank 30 (FIGS. 4A and 4B).

A vertical cliff surface 34 and an outward slope surface 36 will be formed on the workpiece blank 30. These surfaces 34 and 36 comprise crescent-shaped cuts 38 resulting from the almost arc-shaped cutting pattern of the cutting elements 22. (FIG. 5.) The arc-shaped path formed by the cutting elements 22 has a curvature corresponding to the diameter D of the cutting tool 12 and a depth preferably corresponding to the width W of the cutting elements 22 (see solid and dashed lines in FIG. 5). The axial cutting tool 12 is shifted between passes so that there is substantial overlap between adjacent passes (as is common in plunge milling operations), thereby creating a scalloped cut cliff surface as shown in FIG. 5.

In the second sequence, material is removed from a second start-pass longitudinal line to a second stop-pass longitudinal line on the workpiece blank. In the illustrated embodiment, the second start-pass line is at approximately the one-o-clock position, the second stop-pass line coincides with the first start-pass line (i.e., two-o-clock position), and the start-sequence position is at one end of the workpiece blank 30. The pass depth may be the same as in the first sequence.

To begin the second sequence, the rotating tool 12 is aligned with the second start-pass longitudinal line and with the start-sequence location on the workpiece blank 30. The rotating tool 12 is moved axially down into engagement with the workpiece material and then moved both axially and transaxially to follow the desired profile to the second stop-pass position (i.e., the first start-pass position) (FIG. 6A). Similar passes are continued for the entire length of the workpiece blank 30 (FIG. 6B). A scalloped vertical cliff surface 40 and a scalloped outward slope surface 38 will be formed on the workpiece blank 30 (FIGS. 7A and 7B). The outward slope surface 38 preferably eliminates the first-pass cliff surface 34 (see FIGS. 4A and 4B) and smoothly transitions into the first-pass slope surface 36.

In the third sequence, material is removed from a third start-pass longitudinal line to a third stop-pass longitudinal line on the workpiece blank 30. In the illustrated embodiment, the third start-pass line is at approximately the twelve-o-clock position, the third stop-pass line coincides with the second start-pass line (i.e., one-o-clock position), and the start-sequence position is at one end of the workpiece blank 30. Again, the pass depth can be the same as in the previous two sequences.

Figure 8A:
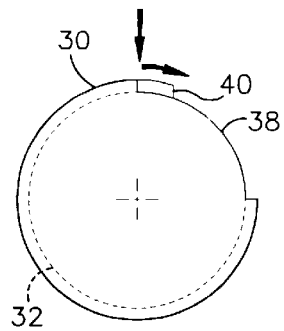
FIGS. 8A and 8B are schematic side and perspective views, respectively, of the workpiece illustrating an initial cutter pass of a third sequence of passes according to the present invention.
Figure 8B:
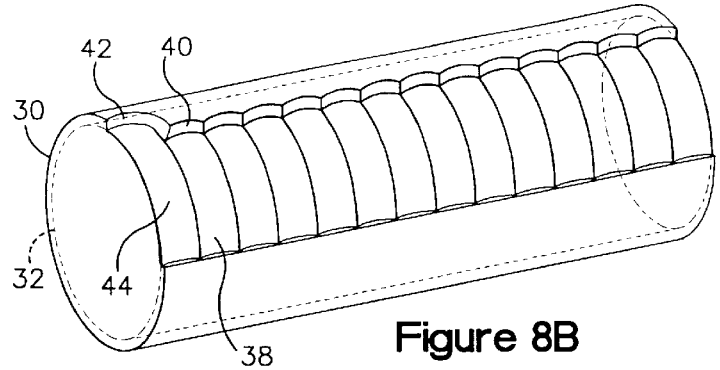
Figure 9A:
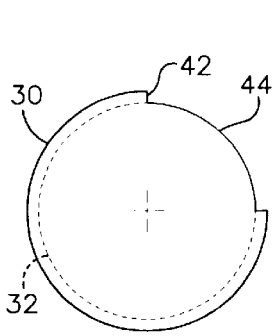
FIGS. 9A and 9B are schematic side and perspective views, respectively, of the workpiece blank once the first, second and third sequences of passes have been completed.
Figure 9B:
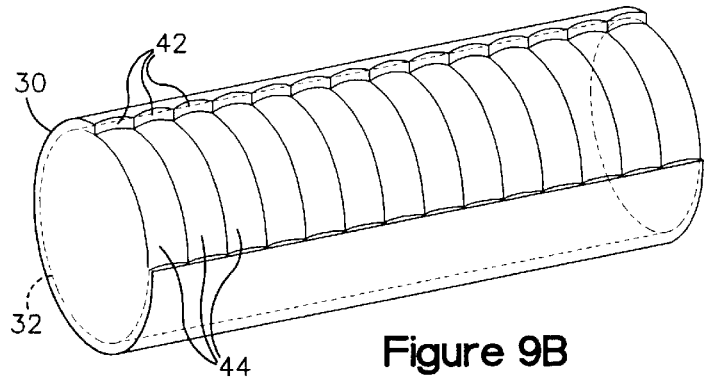
Figure 10A:
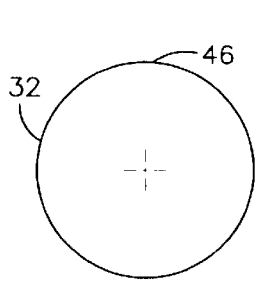
FIGS. 10A and 10B are schematic side and perspective views, respectively, of the workpiece blank once the method of the present invention has been performed on all four quadrants of the workpiece.
Figure 10B:
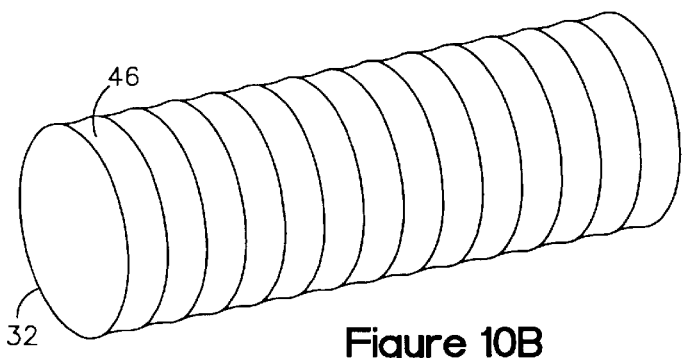

To begin the third sequence, the rotating tool 12 is aligned with the third start-pass longitudinal line and with the start-sequence location on the workpiece blank 30. The rotating tool 12 is moved axially down into engagement with the workpiece material, and then moved both axially and transaxially to follow the desired profile to the third stop-pass line (i.e., the second start-pass line. (FIG. 8A.) Similar passes are continued for the entire length of the workpiece blank 30 (FIG. 8B) to form a vertical cliff surface 42 and an outward slope surface 44 on the workpiece blank 30 (FIGS. 9A and 9B). The outward slope surface 44 can and preferably eliminates the second-pass cliff surface 40 (see FIGS. 7A and 7B) and smoothly translates into the second-pass slope surface 42.

In the illustrated method, the material is removed from the workpiece blank 30 by three sequences each comprising a series of parallel axial passes of the axial cutting tool 12 along the length of the workpiece blank 30. However, methods comprising more or fewer sequences and/or non-parallel passes, are possible with and contemplated by, the present invention. In fact, and for example, in certain situations, only one sequence of axial passes may be possible to accomplish the desired profile. It may be further noted that although the method of the present invention is illustrated on cylindrical-like surfaces, it may be employed in many other curved or contoured workpiece blanks and/or desired profiles.

As was indicated above, the three sequences can then be repeated on the other quadrants of the illustrated workpiece blank 30 to acquire the desired profile. In this manner, the milling method of the present invention provides an intermediate product 46 (i.e., prior to finishing/polishing steps) (FIGS. 9A and 9B) which is much closer in appearance to a final part than when conventional plunge milling is used. With traditional plunge milling operations, a "terracing" procedure is used, so that the cutting tool does not intrude upon material in a vertically adjacent area that is intended to protrude in the finished part. This usually requires a "bump-roughing" procedure to smooth out the stepped profile before performing the final finishing/polishing steps. These "bump-roughing" steps can be eliminated with the milling method of the present invention.

The present invention also significantly reduces wear-and-tear on the milling system 10. In traditional peripheral milling operations, the cutting element initially contacts the workpiece blank at a maximum cut depth and then decreases as the side cutting insert rotates relative to the tool holder axis. This results in unequal fluctuating forces being placed upon the cutting insert, the tool holder and/or the spindle which translates into increased wear and/or elevated noise levels. With the present plunge milling method, cutting depths can be substantially constant thereby eliminating unequal-force issues and significantly prolonging the useful lives of the system's components. By way of example, cutting inserts usage (e.g., replacement rates) can be reduced by 90% or more. Chatter is significantly reduced because cutting forces can be aligned with the most rigid axis of the system.

The reduction of wear-and-tear on the milling system is reflected in the curled chips produced by the cutting steps. Specifically, chips produced by the milling method of the present invention have a substantially uniform thickness and usually a varying width along the length of the chip 48 (See FIGS. 9A and 9B). In contrast, the chips produced by peripheral milling usually vary in thickness with the chip being thickest at the point of entry and thinnest at completion of the cut.

One can now appreciate the present invention provides a plunge milling method wherein an axial cutting tool is moved both axially and transaxially while in engagement with the workpiece material. Also, transaxial movement of the axial cutting tool can be one dimensional or two dimensional. That is, in an orthogonal coordinate system with the z-axis aligned with the axis of the cutting tool, the cutting tool can move along either the x-axis or the y-axis, or both, while the cutting tool is being moved along the z-axis.

Those skilled in the art will also appreciate that a computer-readable medium can be provided with instructions for controlling a computer system to control movement of an axial cutting tool for the removal of material from a workpiece blank during a rough cutting procedure, by the above-described method. Also, there can be provided a computer-readable medium containing instructions for controlling a computer system used to create a plunge cutting milling system program that can be used to program a plunge milling system for controlling movement of an axial cutting tool in accordance with the contoured plunge cutting method described herein. The instructions preferably include an instruction set that enables selection by a user of a profiled plunge cutting mode that generates instructions for use by a plunge milling system to perform contoured plunge milling in accordance with the present invention. The instructions on the computer-readable medium can be loaded into a computer. The computer, in accordance with such instructions, can provide on a computer screen an icon or the like which can be clicked on with a mouse or otherwise selected to implement a contoured plunge milling operation that produces a contoured plunge milling instruction set for controlling a plunge milling system, upon receiving selected parameters from a user.

Although the invention has been shown and described with respect to a certain preferred embodiment or embodiments, equivalent alterations and modifications will occur to others skilled in the art upon the reading and understanding of this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several illustrated embodiments, such feature may be combined with one or more other features of the other embodiments, as may be desired and advantageous for any given or particular application.

What is claimed is:

1. A method for effecting rapid removal of material from a workpiece during a cutting procedure, said method comprising the steps of:
    rotating an axial cutting tool about a rotation axis that is parallel to an axial feed axis;
    moving the tool along said rotation axis and into engagement with the workpiece to cut material therefrom; and
    when the tool is engaged with the workpiece, moving the tool transaxially simultaneously with the axial movement while maintaining the rotation axis of the tool parallel to the axial feed axis, whereby material is removed from a region of the workpiece along a curved path without any peripheral cutting.

2. A method as set forth in claim 1 further comprising the steps of:
    retracting the tool along said rotation axis;
    aligning the tool with an adjacent region of the workpiece; and
    repeating the moving steps.

3. A method as set forth in claim 2, further comprising the step of laterally shifting the tool away from the workpiece prior to the retracting step.

4. A method as set forth in claim 1, further comprising repeating said steps until an intermediate workpiece is formed and finishing the intermediate workpiece to produce the final workpiece.

5. A method as set forth in claim 1, wherein said moving steps are repeated for a series of passes along a length of the workpiece.

6. A method as set forth in claim 5, wherein said series of passes are parallel and begin at a start-pass line and stop at a stop-pass line.

7. A method as set forth in claim 5, wherein said series of passes are repeated in a plurality of sequences.

8. An intermediate product made by the process of claim 1, said intermediate product comprising at least one curved cliff having scalloped shape rows corresponding to the axial and transaxial movement of the cutting tool.

9. A system for performing the method of claim 1, said system comprising the axial cutting tool, a feed mechanism for the tool, and a controller for controlling the feed mechanism; said controller being programed to provide the axial and transaxial movement of the axial cutting tool.

10. A method of controlling a milling system that includes an axial cutting tool on which at least one cutting element is carried for rotation about an axis, a feed mechanism for providing axial and transaxial movement to the tool, and a controller for controlling the feed mechanism, said method comprising the steps of creating an instruction set for directing the milling system to perform the method of claim 1, and operating the milling system in accordance with the instruction set.

11. A computer-readable medium containing instructions for controlling a computer system to control movement of an axial cutting tool for the removal of material from a workpiece during a rough cutting procedure, by the method according to claim 1.

12. A computer-readable medium containing instructions for controlling a computer system to create a plunge milling system program that can be used to program a plunge milling system for controlling movement of an axial cutting tool for the removal of material from a workpiece during a rough cutting procedure, the instructions including an instruction set that enables selection by a user of a profiled plunge cutting mode that generates instructions for use by a plunge milling system to perform the method according to claim 1.

13. A plunge milling system for effecting rapid removal of material from a workpiece during a cutting procedure, said system comprising:
    an axial cutting tool on which at least one axial cutting element is carried for rotation about an axis;
    a feed mechanism for providing axial and transaxial movement to the tool; and
    a controller for controlling the feed mechanism, said controller being programmed to move the tool along said axis and into engagement with the workpiece for cutting material from the workpiece, and during at least a portion of the axial movement of the tool, when the tool is engaged with the workpiece, also move the tool transaxially and simultaneously with the axial movement, whereby material is removed from the workpiece along a curved path without any peripheral cutting.

14. A plunge milling method for effecting rapid removal of material from a workpiece during a cutting procedure, said method comprising the steps of:
    rotating an axial cutting tool about an axis;
    moving the tool along said axis and into engagement with the workpiece to cut material therefrom; and
    when the tool is engaged with the workpiece, moving the tool transaxially simultaneously with the axial movement, whereby material is removed from a region of the workpiece along a curved path without any peripheral cutting.

15. A method as set forth in claim 14 further comprising the steps of:
    retracting the tool along said axis;
    aligning the tool with an adjacent region of the workpiece; and
    repeating the moving steps.

16. A method as set forth in claim 15, further comprising the step of laterally shifting the tool away from the workpiece prior to the retracting step.

17. A method as set forth in claim 14, said moving steps are repeated for a series of passes along a length of the workpiece without any movement of the axial cutting tool into the workpiece.

18. A computer-readable medium containing instructions for controlling a computer system to control movement of an axial cutting tool for the removal of material from a workpiece during a rough cutting procedure, by the method according to claim 14.

19. A computer-readable medium containing instructions for controlling a computer system to create a plunge milling system program that can be used to program a plunge milling system for controlling movement of an axial cutting tool for the removal of material from a workpiece during a rough cutting procedure, the instructions including an instruction set that enables selection by a user of a profiled plunge cutting mode that generates instructions for use by a plunge milling system to perform the method according to claim 14.

* * * * *